(12) United States Patent
Jeong et al.

(10) Patent No.: US 6,904,608 B2
(45) Date of Patent: Jun. 7, 2005

(54) SPRING FOR MOTORS AND OPTICAL DISK DRIVER WITH SUCH SPRING

(75) Inventors: Chang-Hwa Jeong, Pusan (KR); Jun-Sung Lee, Suwon-si (KR)

(73) Assignee: Samsung Electro-Mechanics Co., Ltd., Kyunggi-do (KR)

(*) Notice: Subject to any disclaimer, the term of this patent is extended or adjusted under 35 U.S.C. 154(b) by 132 days.

(21) Appl. No.: 10/334,984

(22) Filed: Jan. 2, 2003

(65) Prior Publication Data
US 2003/0202457 A1 Oct. 30, 2003

(30) Foreign Application Priority Data

Apr. 26, 2002 (KR) ........................................ 2002-23094
Jun. 28, 2002 (KR) ........................................ 2002-37071

(51) Int. Cl.[7] ........................ G11B 17/028; G11B 23/00
(52) U.S. Cl. ...................................... 720/695; 369/263.1
(58) Field of Search ................................ 720/695, 698; 369/263.1; 439/500, 68; 310/81

(56) References Cited

U.S. PATENT DOCUMENTS 6,413,117 B1 * 7/2002 Annerino et al. ........... 439/500

FOREIGN PATENT DOCUMENTS

JP          7-63375      *  3/1995
JP       2003-214491     *  7/2003

* cited by examiner

Primary Examiner—Allen Cao
(74) Attorney, Agent, or Firm—Morgan, Lewis & Bockius LLP

(57) ABSTRACT

A spring for motors and an optical disk drive having a motor with such a spring are disclosed. The spring consists of a shaft-hooking part (102) held by the rotating shaft of a motor (M), a rear hooking part (104) held at the rear end surface of the motor, and an elastic connecting part (106) extending between the two hooking parts to connect them to each other.

9 Claims, 5 Drawing Sheets

SPRING FOR MOTORS AND OPTICAL DISK DRIVER WITH SUCH SPRING

BACKGROUND OF THE INVENTION

1. Field of the Invention

The present invention relates, in general, to springs for motors and, more particularly, to a spring used with a motor in an effort to reduce vibration and noise of the motor during operation, and to an optical disk drive having a motor with such a spring.

2. Description of the Prior Art

As well known to those skilled in the art, optical disk drives are devices for recording on and/or reproducing information data from disks using optical systems. Such an optical disk drive comprises a turntable provided on a deck base for seating a disk thereon, a drive means for rotating the turntable, an optical pickup device for recording on and/or reproducing data from the disk while rectilinearly reciprocating over the surface of the disk in a radial direction of the disk, and a pickup-moving means for rectilinearly reciprocating the pickup device.

FIG. 1 is a plan view, showing the construction of a conventional optical disk drive.

As shown in the drawing, the conventional optical disk drive comprises a turntable 20 provided on a deck base 10 at a predetermined position for seating an optical disk thereon. This turntable 20 is connected to the rotating shaft 22a of a first drive motor 22 installed in the deck base 10, and is rotated by the rotating force of the motor 22.

A longitudinal opening 12 is horizontally formed in the deck base 10 along the central axis of said base 10 such that the opening 12 is leveled with the turntable 20. An optical pickup device 40 is installed on the deck base 10 such that the pickup device 40 is movable along the longitudinal opening 12.

In a detailed description, a lead screw 14 is installed on the deck base 10 at a predetermined position such that the screw 14 extends in parallel to the opening 12. The lead screw 14 is selectively rotated in opposite directions by a drive means 30. A longitudinal guider 16 is placed on the deck base 10 at a position opposite to the lead screw 14 while extending in parallel to the lead screw 14.

The pickup device 40 has a pickup base 42, which is provided with an objective lens 44 for concentrating light beams in a specified direction to focus the beams on a desired point on the surface of the disk. Two internally threaded pieces 46 are formed along a first edge of the pickup base 42 at positions opposite to the guider 16. The two internally threaded pieces 46 engage with the lead screw 14 such that they are linearly moved along the lead screw 14 in response to a rotating motion of the screw 14. A guide piece 48 is formed at a second edge of the pickup base 42, and movably engages with the guider 16, so the guide piece 48 is linearly moved along the guider 16 when the two internally threaded pieces 46 are linearly moved along the lead screw 14. Therefore, the pickup device 40 rectilinearly reciprocates in a radial direction of the disk in accordance with the opposite directional rotation of the lead screw 14.

The drive means 30 for rotating the lead screw 14 comprises a second drive motor 32 which is a reversible motor installed at a predetermined position on the deck base 10. A drive gear 34 is mounted to the rotating shaft of the motor 32 such that the gear 34 is rotated along with the rotating shaft in the same direction. The drive means 30 also has a driven gear 38 fixedly and concentrically mounted to an end of the lead screw 14. The driven gear 38 is rotated in conjunction with the drive gear 34 due to a middle gear 36 engaging with both the drive and driven gears 34 and 38. That is, the rotating force of the drive gear 34 is transmitted to the driven gear 38, with the middle gear 36 acting as a power transmission gear.

When the second motor 32 is rotated in a direction during operation of the optical disk drive, the lead screw 14 is rotated in the same direction, and the pickup device 40 is linearly moved in accordance with the rotating motion of the lead screw 14. The second motor 32 can be rotated in opposite directions, so the pickup device 40 can linearly reciprocate along the lead screw 14, thus recording on or reproducing data from the disk.

However, the conventional optical disk drives typically use sled motors or feed motors as their second drive motors for the lead screws, so the optical disk drives are problematic in that the motors may undesirably generate vibration and noise during operation, and negatively affect the operational performance of the optical disk drives.

In the prior art, the manufacturers of optical disk drives, who cannot themselves find any specific measure to counter such vibration and noise of motors installed in their products, only produce optical disk drives using spec motors purchased from motor manufacturers who produce the motors without carefully considering that their motors may be used in optical disk drives which require silent motors with reduced vibration and noise.

Therefore, when the spec motors installed in the optical disk drives unexpectedly generate severe vibration exceeding a predetermined maximum level, the motors cause the gears and other devices which are cooperating with the motors to be excessively vibrated and generate noise, thus ill-affecting the operational performance of the optical disk drives, in addition to disturbing those around the disc drives.

SUMMARY OF THE INVENTION

Accordingly, the present invention has been made keeping in mind the above problems occurring in the prior art, and an object of the present invention is to provide a spring for motors, which is used with a motor to effectively reduce vibration and noise of the motor during operation of said motor.

Another object of the present invention is to provide an optical disc drive, which has a motor with such a spring, thus being minimized in its percent defect caused by vibration and noise of the motor.

In order to accomplish the above objects, an embodiment of the present invention provides a spring for motors, comprising: a shaft-hooking part held by the rotating shaft of a motor; a rear hooking part held at the rear end surface of the motor; and an elastic connecting part extending between the shaft-hooking part and the rear hooking part to connect them to each other, whereby the spring applies elastic load to the shaft of the motor when the spring is attached to the motor, thus reducing vibration of the motor.

The present invention also provides an optical disk drive comprising an optical pickup device for recording on or reproducing data from an optical disk while reciprocating in a radial direction of the disk by a rotating force of a drive motor, wherein a spring is attached to the drive motor so as to absorb the vibration of the motor and reduce operational noise of the motor, the spring consisting of a shaft-hooking part held by the rotating shaft of the motor, a rear hooking part held at the rear end surface of the motor, and an elastic connecting part extending between the two hooking parts to connect them to each other.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Figure 1:
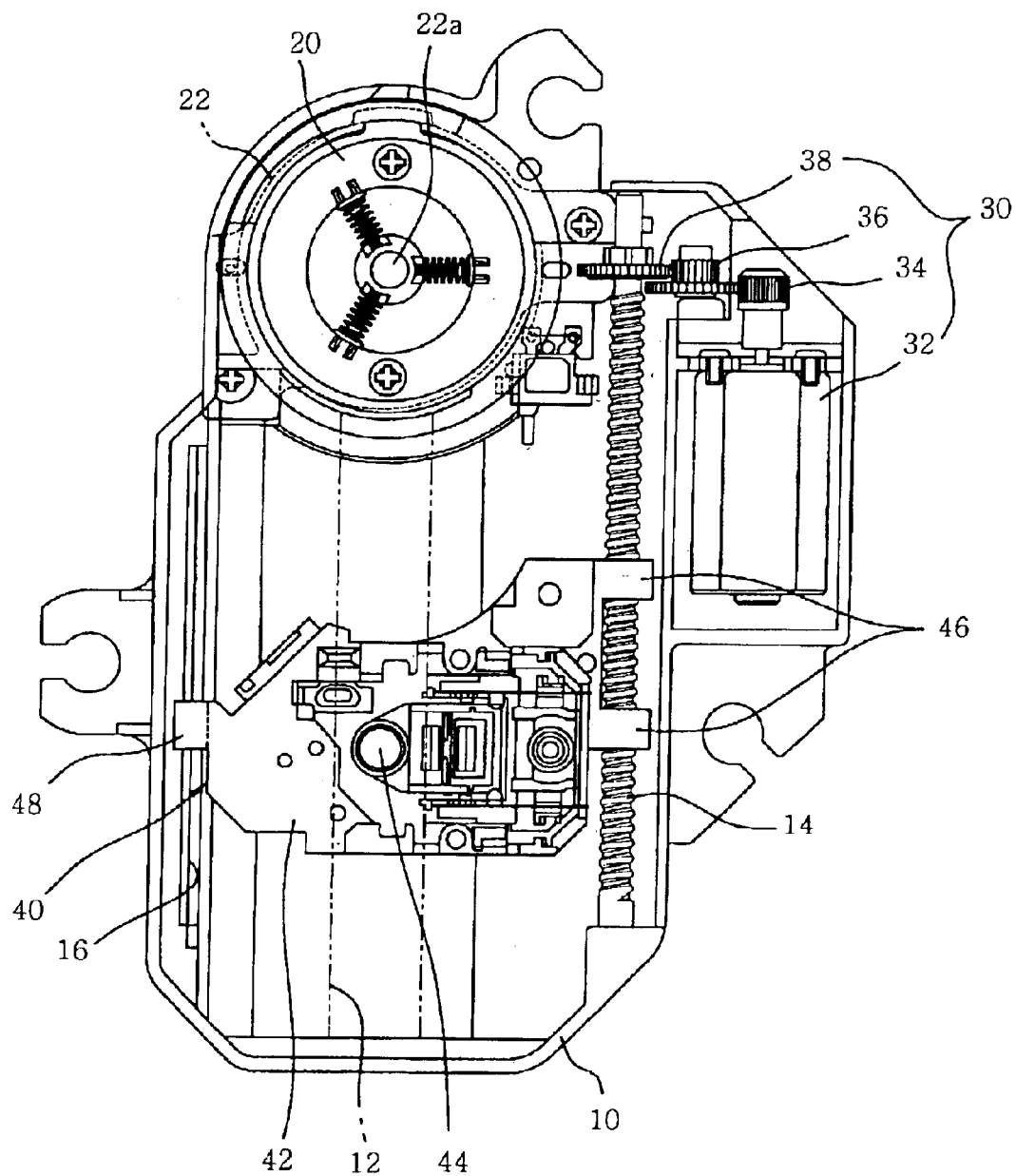
FIG. 1 is a plan view, showing the construction of a conventional optical disk drive.

Reference should now be made to the drawings, in which the same reference numerals are used throughout the different drawings to designate the same or similar components.

Figure 2:
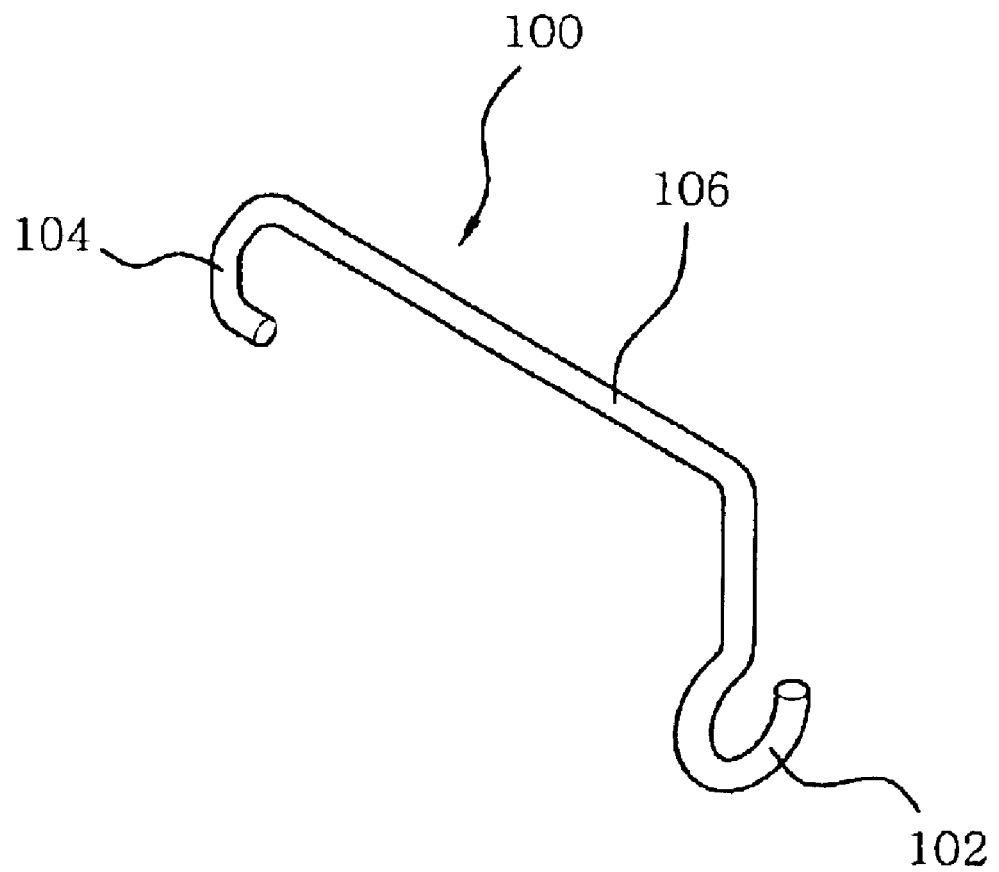
FIG. 2 is a perspective view of the spring for motors in accordance with the primary embodiment of the present invention.
Figure 3:
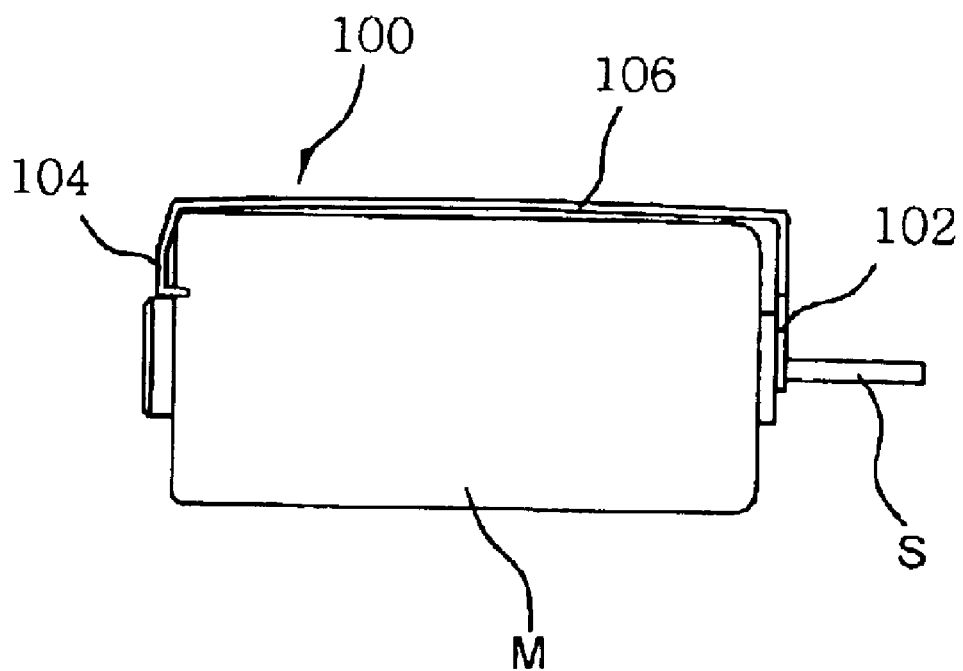
FIG. 3 is a side view of a motor provided with the spring of this invention.
Figure 4:
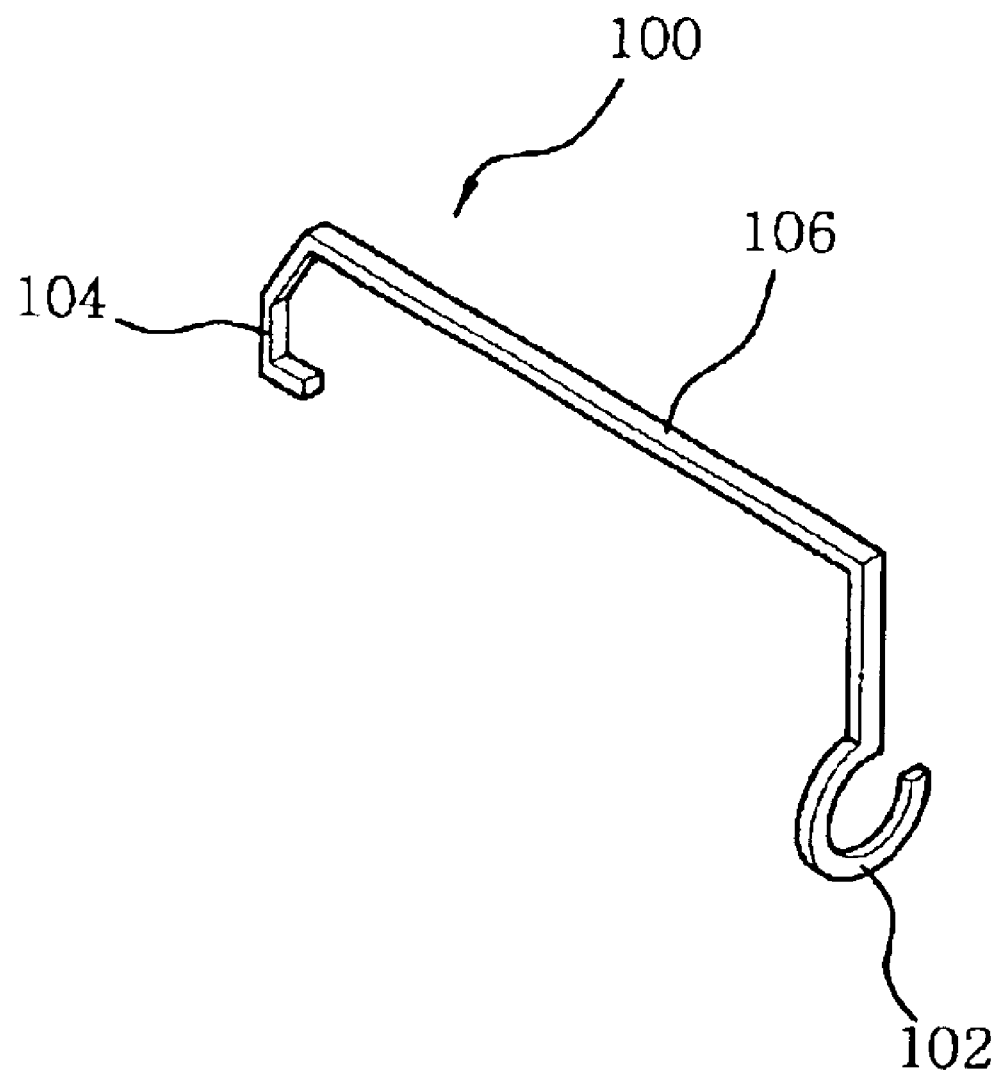
FIG. 4 is a perspective view of the spring for motors in accordance with the second embodiment of the present invention.
Figure 5:
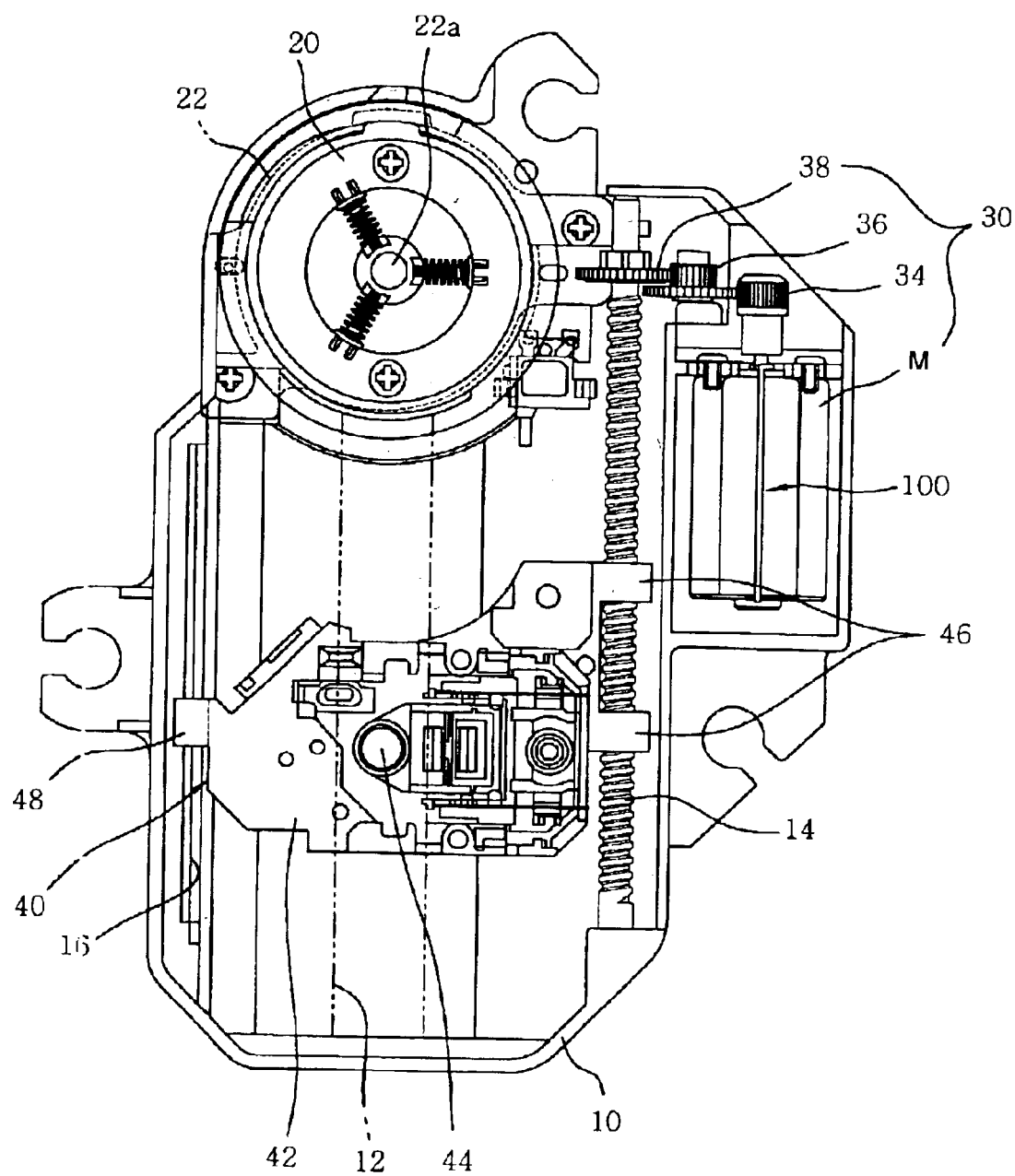
FIG. 5 is a plan view of an optical disk drive having a motor provided with the spring of this invention.

FIG. 2 is a perspective view of the spring for motors in accordance with the primary embodiment of the present invention. FIG. 3 is a side view of a motor provided with the spring of this invention. FIG. 4 is a perspective view of the spring for motors in accordance with the second embodiment of this invention. FIG. 5 is a plan view of an optical disk drive having a motor provided with the spring of this invention.

As shown in FIGS. 2 and 3, the spring 100 for motors according to this invention is made of steel. The spring 100 is a single body, with a shaft-hooking part 102, a rear hooking part 104, and a connecting part 106 extending between the two hooking parts 102 and 104 to connect them to each other to form a single structure. The shaft-hooking part 102 is held by the rotating shaft "S" of a motor "M", while the rear hooking part 104 is held at the rear end surface of the motor "M" when the spring 100 is installed on the motor "M".

The shaft-hooking part 102 of the spring 100 preferably has a partially opened ring shape capable of being fitted over the shaft "S" of the motor from a side of the shaft "S". The rear hooking part 104 is specifically bent to have an inwardly directed insert end, so the part 104 is inserted into a hole formed at the center of the rear end surface of the motor "M". The connecting part 106 preferably has predetermined elasticity capable of absorbing vibration of the motor "M", thus reducing vibration and noise of the motor when the spring 100 is installed on the motor.

Of course, it should be understood that the shape of the shaft-hooking part 102 may be variously changed without affecting the functioning of this invention if the part 102 is reliably held by the rotating shaft "S" of the motor. In the same manner, the rear hooking part 104 may be variously changed in its shape without affecting the functioning of this invention if the part 104 is reliably held at the rear end surface of the motor.

In addition, the spring 100 of this invention is preferably produced in the form of an integrated body through a steel injection molding process. However, it should be understood that the spring 100 may be produced by appropriately bending a steel bar having a circular cross section, in place of the injection molding process. Furthermore, the spring 100 may be produced by appropriately bending a flat steel strip as shown in FIG. 4. In such a case, the flat steel strip for the spring 100 has predetermined thickness and width.

In a brief description, it should be understood that the shape and producing process of the spring 100 are not limited to the above-mentioned shape and processes, but may be somewhat freely changed without affecting the functioning of this invention if the spring 100 effectively absorbs vibration of the motor during its operation.

The spring 100 of this invention is preferably attached to the motor when the vibration of the motor suddenly becomes severe.

When it is desirable to attach the spring 100 to the motor "M" of an optical disk drive, the attachment of the spring 100 to the motor is easily accomplished by locking the shaft-hooking part 102 to the motor shaft "S", and locking the rear hooking part 104 to the rear end surface of the motor. In such a case, the length of the connecting part 106 of the spring 100 is shorter than that of the motor housing, so the connecting part 106 is bent to form an arc shape, thus allowing the spring 100 to have elasticity. Due to the elasticity, the spring 100 applies elastic load to the motor shaft "S".

The shaft-hooking part 102 thus elastically biases the motor shaft "S" upward, thereby minimizing the clearance between the bearing and the motor shaft. Since the clearance between the bearing and the motor shaft is minimized, the basic source generating the vibration of the motor is almost completely removed from the motor and the vibration of the motor shaft is desirably reduced during operation of the motor. Due to such a reduction in the vibration of the motor shaft, the operational noise of the motor is minimized.

An optical disk drive having a motor with the spring of this invention will be described herein below with reference to FIG. 5. As shown in the drawing, the optical disk drive of this invention comprises a turntable 20 provided on a deck base 10 at a predetermined position for seating an optical disk thereon. This turntable 20 is connected to the rotating shaft 22a of the first drive motor 22 installed on the deck base 10, and is rotated by the rotating force of the motor 22.

A longitudinal opening 12 is horizontally formed in the deck base 10 along the central axis of said base 10 such that the opening 12 is leveled with the turntable 20. An optical pickup device 40 is installed on the deck base 10 such that the pickup device 40 is movable along the longitudinal opening 12.

In a detailed description, a lead screw 14 is installed on the deck base 10 at a predetermined position such that the screw 14 extends in parallel to the opening 12. The lead screw 14 is selectively rotated in opposite directions by a drive means 30. A longitudinal guider 16 is placed on the deck base 10 at a position opposite to the lead screw 14 while extending in parallel to the lead screw 14.

The pickup device 40 has a pickup base 42, which is provided with an objective lens 44 for concentrating light beams in a specified direction to focus the beams on a desired point on the surface of the disk. Two internally threaded pieces 46 are formed along a first edge of the pickup base 42 at positions opposite to, the guider 16. The two internally threaded pieces 46 engage with the lead screw 14 such that they are linearly moved along the lead screw 14 in response to a rotating motion of the screw 14. A guide piece 48 is formed at a second edge of the pickup base 42, and movably engages with the guider 16, so the guide piece 48 is linearly moved along the guider 16 when the two internally threaded pieces 46 are linearly moved along the lead screw 14. Therefore, the pickup device 40 rectilinearly reciprocates in a radial direction of the disk in accordance with the opposite directional rotation of the lead screw 14.

The drive means 30 for rotating the lead screw 14 comprises a second drive motor "M" which is a reversible motor installed at a predetermined position of the deck base 10. A drive gear 34 is mounted to the rotating shaft "S" of the motor "M" such that the gear 34 is rotated along with the rotating shaft "S" in the same direction. The drive means 30 also has a driven gear 38 fixedly and concentrically mounted to an end of the lead screw 14. The driven gear 38 is rotated in conjunction with the drive gear 34 due to a middle gear 36 engaging with both the drive and driven gears 34 and 38. That is, the rotating force of the drive gear 34 is transmitted to the driven gear 38, with the middle gear 36 acting as a power transmission gear.

When the second motor "M" is rotated during operation of the optical disk drive, the motor "M" may generate vibration due to the clearance between the bearing and the motor shaft "S". In order to minimize such vibration of the motor "M", the spring 100 is attached to the motor "M" and applies elastic load to the motor "M". In such a case, the elastic load is adjusted by the size and shape of the spring 100.

When the second drive motor "M" is rotated in a direction during operation of the optical disk drive, the lead screw 14 is rotated in the same direction, the pickup device 40 is moved in accordance with the rotating motion of the lead screw 14. The second drive motor "M" can be rotated in opposite directions, so the pickup device 40 can linearly reciprocate along the lead screw 14, thus recording on or reproducing data from the disk.

During operation of the motor "M", vibration of the motor is attenuated by the spring 100 as described above, so it is possible to remarkably reduce operational noise of the motor.

Such a reduction in the operational noise of the motor was experimentally measured. Since the spring of this invention removes the noise source from a spec motor installed in an optical disk drive, the springs of this invention silence the spec motors of optical disk drives to a desired level. Such silence of the motors installed in the optical disk drives enhances market competitiveness of the disk drives.

Particularly, vibration of the motors causes serious damage to the components of optical disk drives. However, the spring of this invention prevents generation of such vibration of the motor, so the spring protects the components of the optical disk drive from damage caused by vibration of the motor.

The springs of this invention are preferably used with motors installed in optical disk drives.

As described above, the present invention provides a spring for motors installed in optical disk drives and an optical disk drive having a motor provided with such a spring. When the spring of this invention is attached to the motor of an optical disk drive, it reduces vibration and noise of the motor during operation. In addition, the spring of this invention removes the noise source from the motor of the optical disk drive, so market competitiveness of the optical disk drives is enhanced.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A spring for motors for an optical disk drive, comprising:

a shaft-hooking part held by a rotating shaft of a motor;

a rear hooking part held at a rear end surface of the motor; and an elastic connecting part extending between the shaft-hooking part and the rear hook part to connect said hooking parts to each other, whereby said spring applies load to the shaft of the motor when the spring is attached to the motor, thus reducing vibration of the motor.

2. The spring according to claim 1, wherein said connecting part is elastically bent to give elasticity to the spring when the spring is attached to the motor, so the shaft-hooking part elastically biases the shaft of the motor upward and minimizes a clearance between a bearing and the shaft, thus reducing vibration and noise of the motor.

3. The spring according to claim 1, wherein said shaft-hooking part has a partially open ring shape capable of being fitted over the shaft of the motor from a side of said shaft, and said rear hooking part is shaped to be held at a hole formed at the rear end surface of the motor.

4. The spring according to claim 2, wherein said shaft-hooking part has a partially open ring shape capable of being fitted over the shaft of the motor from a side of said shaft, and said rear hooking part is shaped to be held at a hole formed at the rear end surface of the motor.

5. The spring according to claim 1, wherein the shaft-hooking part, the rear hooking part and the connecting part are integrally formed as a single structure by bending a single bar.

6. The spring according to claim 1, wherein the shaft-hooking part, the rear hooking part and the connecting part are integrally formed as a single structure by bending a flat steel strip having predetermined thickness and width.

7. An optical disk drive comprising an optical pickup device recording on or reproducing data from an optical disk while reciprocating in a radial direction of the disk by a rotating force of a drive motor, wherein a spring is attached to the drive motor so as to absorb vibration of the motor and reduce noise of the motor, said spring consisting of a shaft-hooking part held by a rotating shaft of said motor, a rear hooking part held at a rear end surface of the motor, and an elastic connecting part extending between the shaft-hooking part and the rear hooking part to connect said hooking parts to each other.

8. The optical disk drive according to claim 7, wherein said spring is formed by bending a single bar.

9. The optical disk drive according to claim 7, wherein said spring is formed by bending a flat steel strip having predetermined thickness and width.

* * * * *